(12) United States Patent
Wang et al.

(10) Patent No.: US 10,816,846 B2
(45) Date of Patent: Oct. 27, 2020

(54) DISPLAY DEVICE, DISPLAY PANEL, COLOR FILTER SUBSTRATE AND COLOR FILTER

(71) Applicant: BOE TECHNOLOGY GROUP CO., LTD., Beijing (CN)

(72) Inventors: Fangzhou Wang, Beijing (CN); Xiaochuan Chen, Beijing (CN); Wei Wang, Beijing (CN); Jifeng Tan, Beijing (CN); Jian Gao, Beijing (CN); Xianqin Meng, Beijing (CN); Xiandong Meng, Beijing (CN); Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/412,811

(22) Filed: May 15, 2019

(65) Prior Publication Data

US 2020/0050053 A1    Feb. 13, 2020

(30) Foreign Application Priority Data

Aug. 9, 2018   (CN) .......................... 2018 1 0904232

(51) Int. Cl.
*G02F 1/1335*   (2006.01)
*G02F 1/1343*   (2006.01)
*F21V 8/00*     (2006.01)

(52) U.S. Cl.
CPC ...... *G02F 1/133514* (2013.01); *G02F 1/1343* (2013.01); *G02F 1/133528* (2013.01); *G02B 6/0033* (2013.01)

(58) Field of Classification Search
CPC ......... G02F 1/133512; G02F 1/133514; G02F 1/1343; G02F 1/133528
See application file for complete search history.

(56) References Cited

U.S. PATENT DOCUMENTS

| 7,579,775 B2 * | 8/2009 | Song ..................... H01L 27/322 313/112 |
| 2003/0062520 A1 * | 4/2003 | Toguchi ................ H01L 27/322 257/40 |
| 2008/0121781 A1 * | 5/2008 | Boettiger ............. G02B 5/1866 250/208.1 |
| 2019/0131361 A1 * | 5/2019 | Zhou ................. G02F 1/133504 |

FOREIGN PATENT DOCUMENTS

CN    107111058 A    8/2017

* cited by examiner

*Primary Examiner* — Dung T Nguyen

(74) *Attorney, Agent, or Firm* — Foley & Lardner LLP

(57) ABSTRACT

The present disclosure provides a display device, a display panel, a color filter substrate, and a color filter, and relates to the field of display technology. The color filter of the present disclosure includes a grating layer and a photo-luminescent layer. The grating layer is configured to generate a surface plasmon effect under the action of incident light. The photo-luminescent layer is disposed on the light exiting surface of the grating layer.

18 Claims, 4 Drawing Sheets

DISPLAY DEVICE, DISPLAY PANEL, COLOR FILTER SUBSTRATE AND COLOR FILTER

CROSS REFERENCE TO RELATED APPLICATIONS

The present application is based upon and claims priority of Chinese patent application No. 201810904232.8, filed on Aug. 9, 2018, the entire disclosure of which is hereby incorporated by reference as a part of the present application.

TECHNICAL FIELD

The present disclosure relates to the field of display technology, and more particularly to a display device, a display panel, a color filter substrate and a color filter.

BACKGROUND

In a liquid crystal display panel, a color filter is an important component, which may convert a monochrome backlight emitted by the backlight into three colors of red, green and blue to realize color display. At present, the application of quantum dot color filter is more and more extensive. Under the excitation of monochromatic light, quantum dots of different sizes will radiate light of different colors, thus realizing color display.

SUMMARY

The present disclosure may provide a display device, a display panel, a color filter substrate, and a color filter.

According to one aspect of the present disclosure, there is provided a color filter. The color filter includes a grating layer configured to generate a surface plasmon effect under an action of incident light. The color filter includes a photo-luminescent layer disposed on a light exiting surface of the grating layer and configured to emit light of a plurality of colors under the action of the incident light.

In an exemplary arrangement of the present disclosure, the grating layer is in direct contact with the photo-luminescent layer.

In an exemplary arrangement of the present disclosure, a grating period of the grating layer satisfies a formula:

$$P = n\lambda_0 \sqrt{\frac{\varepsilon_1 + \varepsilon_2}{\varepsilon_1 \cdot \varepsilon_2}}$$

where p denotes a grating period, n denotes a positive integer, $\lambda_0$ denotes a wavelength of the incident light, $\varepsilon_1$ denotes a dielectric constant of the grating layer, and $\varepsilon_2$ denotes a dielectric constant of the photo-luminescent layer.

In an exemplary arrangement of the present disclosure, the photo-luminescent layer includes a quantum dot material.

In an exemplary arrangement of the present disclosure, a surface of the grating layer adjacent to the photo-luminescent layer has a plurality of slits that are spaced apart, to diffract light.

In an exemplary arrangement of the present disclosure, the grating layer includes at least one of $SiO_2$, $TiO_2$, Au, Ag and Al.

According to another aspect of the present disclosure, there is provided a color filter substrate. The color filter substrate includes a base substrate, the color filter according to any one of the above. The color filter is provided on the base substrate.

In an exemplary arrangement of the present disclosure, the photo-luminescent layer is located between the base substrate and the grating layer.

According to one aspect of the present disclosure, there is provided a display panel, including the color filter substrate according to any of the above.

In an exemplary arrangement of the present disclosure, the display panel further includes a liquid crystal module disposed on a side of the grating layer away from the photo-luminescent layer. The display panel further includes a light guide plate disposed on a side of the liquid crystal module away from the color filter substrate.

In an exemplary arrangement of the present disclosure, the light guide plate includes a light exiting surface. The light exiting surface is a surface of the light guide plate adjacent to the liquid crystal module. The display panel further includes a light extraction layer disposed on the light exiting surface and configured to extract polarized light from the light guide plate at a collimation angle.

In an exemplary arrangement of the present disclosure, the light extraction layer includes a plurality of light extraction gratings spaced apart. The display panel further includes a planarization layer covering the surface of the light guide plate adjacent to the liquid crystal module and covering the light extraction gratings.

In an exemplary arrangement of the present disclosure, the light guide plate includes a light incident surface adjacent to the light exiting surface. The display panel further includes a light source disposed opposite to the light incident surface and configured to emit light to the light guide plate.

In an exemplary arrangement of the present disclosure, the liquid crystal module includes a first electrode, a second electrode, and a liquid crystal layer disposed between the first electrode and the second electrode.

In an exemplary arrangement of the present disclosure, the display panel further includes a polarizing layer disposed between the color filter substrate and the liquid crystal module.

According to one aspect of the present disclosure, there is provided a display device including the display panel of any one of the above.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate arrangements consistent with the present disclosure and, together with the description, serve to explain the principles of the disclosure. It is apparent that the drawings in the following description are only some of the arrangements of the present disclosure, and other drawings may be obtained from these drawings by those skilled in the art without paying creative effort.

DETAILED DESCRIPTION

Figure 1:
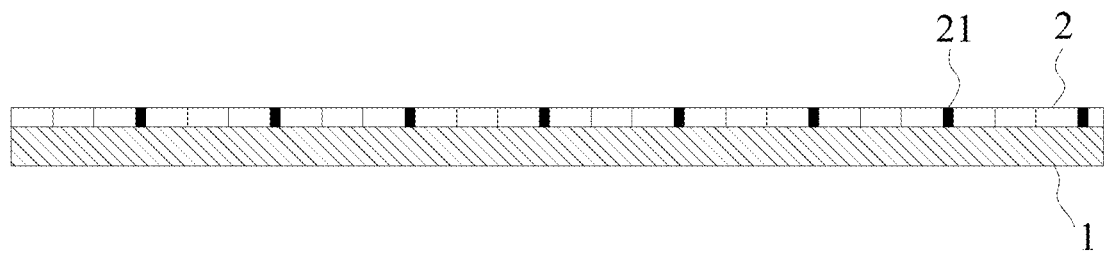
FIG. 1 is a schematic diagram of a color filter according to an arrangement of the present disclosure.

Example arrangements will now be described more fully with reference to the accompanying drawings. However, the example arrangements may be embodied in a variety of forms and should not be construed as being limited to the arrangements set forth herein. Rather, these arrangements are provided so that this disclosure will be thorough and complete, and to fully convey the concept of the exemplary arrangements to those skilled in the art. The same reference numerals in the drawings denote the same or similar structures, and thus their detailed description will be omitted.

Although the relative terms such as "on" and "below" are used in the specification to describe the relative relationship of one component to another component illustrated in the figure, these terms are used in this specification for convenience only, for example, according to the exemplary direction in accompanying drawings. It will be understood that if the device as illustrated is flipped upside down, the component described as on will become the component "below". When a structure is "on" another structure, it may mean that a structure is integrally formed on another structure, or that a structure is "directly" disposed on another structure, or that a structure is "indirectly" disposed on another structure through other structure.

The terms "a", "an", "the", "said" are used to mean the presence of one or more elements/components, etc. The terms "including" and "having" are used to mean the inclusion of an open type and means that there may be additional elements/components/etc. in addition to the listed elements/components/etc. The terms "first" and "second" are used only as indices, not limitation on the number of the objects.

An arrangement of the present disclosure provides a color filter that may be used for a display panel, which may be a liquid crystal display panel.

As shown in FIG. 1, a color filter according to an arrangement of the present disclosure may include a grating layer 1 and a photo-luminescent layer 2.

The grating layer 1 may generate a surface plasmon effect under illumination.

The photo-luminescent layer 2 is provided on a light exiting surface of the grating layer 1.

In the color filter of the present disclosure, during operation, incident light may be irradiated to the photo-luminescent layer 2 via the grating layer 1; and the photo-luminescent layer 2 may radiate light of a plurality of colors under the action of monochromatic incident light to realize color display. At the same time, the grating layer 1 may generate a surface plasmon effect under illumination, so that the intensity of the electric field in the vicinity of the photo-luminescent layer 2 is enhanced, which promotes the excitation of the photo-luminescent layer 2. Thus, the intensity of the colored light may be enhanced, thus improving the display effect.

The various parts of the color filter of the arrangement of the present disclosure are described in detail below:

As shown in FIG. 1, the grating layer 1 may generate a surface plasmon effect under illumination, and the material thereof may be a material having a refractive index with a large imaginary part, such as $SiO_2$. The material $SiO_2$ has a high transmittance, and introduces a small additional light loss. Of course, the material of the grating layer 1 may also be an oxide such as $TiO_2$, or may include a metal such as Au, Ag, and/or Al, to name a few, as long as the wavelength of the light may be matched with that of the photo-luminescent layer 2, and the plasmon effect may be generated.

Figure 2:
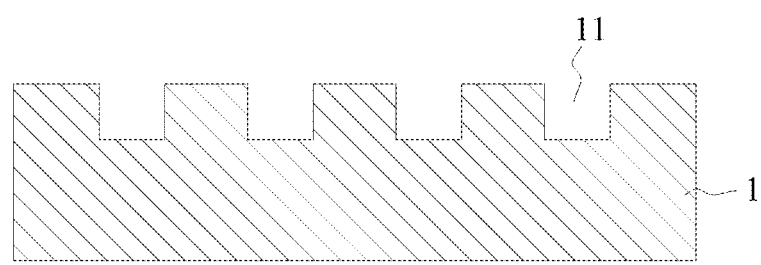
FIG. 2 is a partial enlarged diagram of a grating layer of a color filter according to an arrangement of the present disclosure.

As shown in FIG. 2, the grating layer 1 has a light incident surface and a light exiting surface. The light exiting surface has a plurality of slits 11 which are spaced apart. Light passing through the grating layer 1 is diffracted by the slits 11. The slits 11 may be formed by forming a plurality of grooves on the light exiting surface of the grating layer 1, or forming a plurality of spaced protrusions on the light exiting surface, and a gap between adjacent protrusions is a slit 11.

The grating period of the grating layer 1 may satisfy the following formula:

$$P = n\lambda_0 \sqrt{\frac{\varepsilon_1 + \varepsilon_2}{\varepsilon_1 \cdot \varepsilon_2}}$$

where p denotes a grating period, n denotes a positive integer, $\lambda_0$ denotes a wavelength of the incident light, $\varepsilon_1$ denotes a dielectric constant of the grating layer 1, and $\varepsilon_2$ denotes a dielectric constant of the photo-luminescent layer 2.

The above formula may be derived according to the following two formulas:

$$K_x = K_0 \sin\theta \pm n\frac{2\pi}{p}$$

$$K_{SP} = K_0 \sqrt{\frac{\varepsilon_1 \cdot \varepsilon_2}{\varepsilon_1 + \varepsilon_2}}$$

where $K_x$ denotes a component in the horizontal direction when the light is incident on the grating layer 1 at an angle $\theta$, $K_0$ denotes an incident light wave vector, p denotes a grating period, and n denotes a positive integer. $K_{SP}$ denotes a wave vector of the surface plasmon, $\varepsilon_1$ denotes a dielectric constant of the grating layer 1, and $\varepsilon_2$ denotes a dielectric constant of the photo-luminescent layer 2. Let $K_x=K_{SP}$, while ensuring normal incidence, that is, $\theta=0$. Then, the above formula may be obtained.

It should be noted that, the parameters such as the grating period and height may be different depending on the materials of the grating layer 1.

Figure 3:
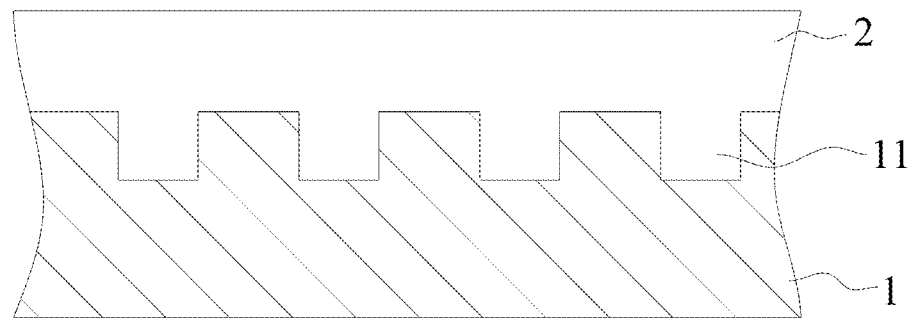
FIG. 3 is a partial enlarged diagram of a color filter according to an arrangement of the present disclosure.

As shown in FIG. 1 to FIG. 3, the photo-luminescent layer 2 may be directly formed on the light exiting surface of the grating layer 1, may directly contact with the grating layer 1, and may emit colored light under the illumination of monochromatic light, so as to realize color display. Of course, other layered structures may be provided between the photo-luminescent layer 2 and the grating layer 1. The photo-luminescent layer 2 may have a plurality of arrays of pixels, each of which includes a plurality of sub-pixels. For example, each pixel may include three sub-pixels, and the three sub-pixels emit different colors, which are red, blue, and green, respectively. For example, the photo-luminescent layer 2 may include light shielding portions 21 that may partition to obtain a plurality of light emitting regions, each of which may include a plurality of sub-pixels.

It should be noted that FIG. 2 is only a schematic diagram of the grating layer 1, and FIG. 3 is only a schematic diagram of the grating layer 1 and the photo-luminescent layer 2, which are not drawn to scale or according to the actual size.

The material of the photo-luminescent layer 2 may include a quantum dot material, which may include a substrate and quantum dots distributed in the substrate, and the quantum dots of different sizes radiate light of different colors. Of course, the photo-luminescent layer 2 may also contain other photo-luminescent materials such as fluorescent materials, as long as the colored light may be radiated under the illumination of monochromatic light. It should be noted that the dielectric constant of the photo-luminescent layer 2 may represent the dielectric constant of the basic material.

The light passing through the grating layer 1 may illuminate the photo-luminescent layer 2, exciting quantum dots of different sizes to radiate light of different colors. During the process of passing through the grating layer 1, the incident light is coupled to the grating layer 1 to resonate, and the plasma of the grating layer 1 absorbs the energy of the incident light to enhance energy of a nearby field of the photo-luminescent layer 2, which generates a plurality of hot spots on the bonding surface of the grating layer 1 and the photo-luminescent layer 2. These hotspots have an intensity of the electric field much larger than that of the incident light. Since the excitation efficiency of quantum dots is related to the intensity of the electric field in the vicinity, the electric field enhanced by the hot spots may promote the excitation of the quantum dots, and improve the conversion efficiency of quantum dots, such that the intensity of colored light may be increased without increasing the intensity of incident light. It may improve the light efficiency of the panel, allow reduction of the intensity of the backlight while ensuring the display effect, and may reduce energy consumption.

Specifically, in a fluorescence process, the excitation rate of a quantum dot is related to the intensity of the electric field where the quantum dot is located. In quantum theory, the excitation rate may be described by Fermi's golden law, as follows:

$$\Gamma = \frac{4\pi^2}{h}|\langle e|\vec{E}\cdot\vec{p}|g\rangle|^2 \rho$$

where $\Gamma$ denotes an excitation rate, h denotes a Planck constant, $\vec{E}$ denotes an electric field at the position of the quantum dot, g denotes an electronic ground state wave function, e denotes an excited state wave function of the electron, and $\vec{p}$ denotes an absorption transition dipole moment of the molecule, and $\rho$ denotes an excited state density.

According to the above formula, for the same fluorescent molecule, when the other conditions are not changed, the intensity of the surrounding electric field is increased, and the excitation rate of the molecule may be increased, thus increasing the fluorescence intensity. Therefore, as long as the intensity of the electric field of the environment in which the quantum dots are placed enhances the conversion efficiency, the light efficiency of the display panel may be improved.

The effect of enhancing the electric field of the grating layer 1 may be verified under the following experiment conditions.

Figure 4:
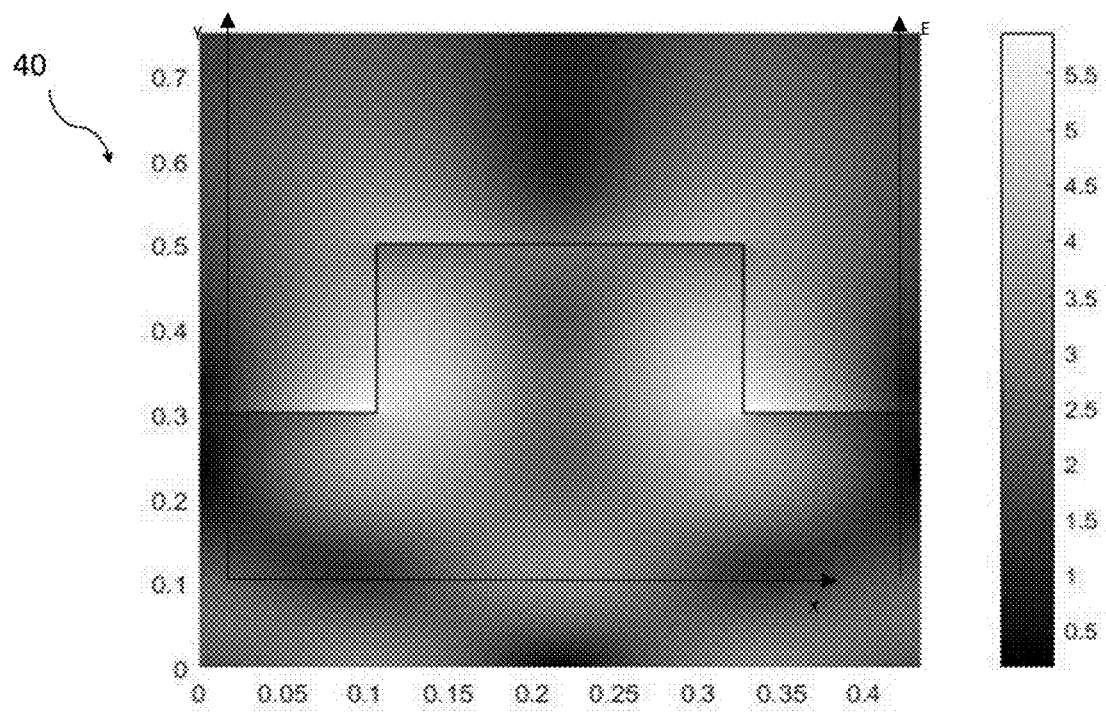
FIG. 4 shows the electric field distribution over a grating period.

The wavelength of the incident light is 532 nm, the material of the grating layer 1 is $SiO_2$, the medium is air, and n=1. The calculated grating period is 433 nm; the width of the slit 11 is 220 nm, and the depth of the slit 11 is 200 nm. It may be calculated that the intensity of the electric field near the grating layer 1 is increased by 2 to 3 times. The calculation results are shown in FIG. 4. FIG. 4 shows an electric field distribution 40 in a grating period. The X and Y axes of FIG. 4 represent the size of the grating, in a unit of um, E represents the intensity of the electric field, and the highlighted portion indicates the intensity of the electric field of the region is enhanced. It may be seen that the intensity of the electric field of the light exiting surface of the grating layer 1 is higher than the intensity of the electric field of the light incident surface.

Figure 5:
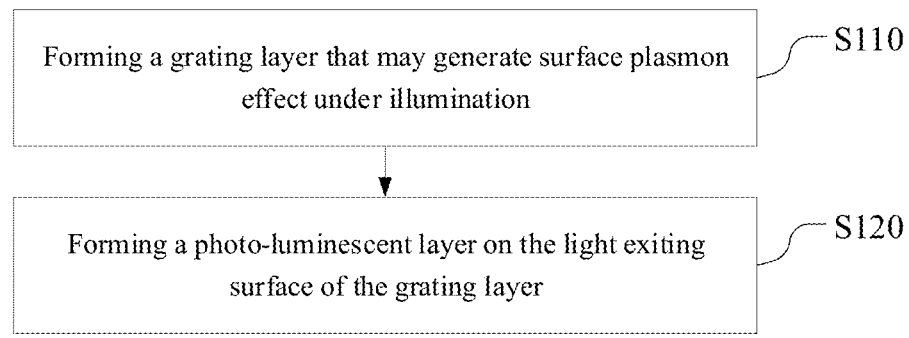
FIG. 5 is a flow chart of a method for manufacturing a color filter according to an arrangement of the present disclosure.

An arrangement of the present disclosure provides a method for manufacturing a color filter. As shown in FIG. 5, the manufacturing method may include the following blocks.

In block S110, a grating layer is formed, the grating layer being configured to generate a surface plasmon effect under the action of incident light.

In block S120, a photo-luminescent layer is formed on the light exiting surface of the grating layer, the photo-luminescent layer being configured to emit light of a plurality of colors under the action of monochromatic incident light.

The beneficial effects of the manufacturing method of the arrangements of the present disclosure may be referred to the arrangement of the color filter described above, and will not be described in detail herein. Moreover, the specific structure of the grating layer and the photo-luminescent layer in the manufacturing method has been described in detail in the arrangement of the above color filter, and details are not described herein again.

Figure 6:
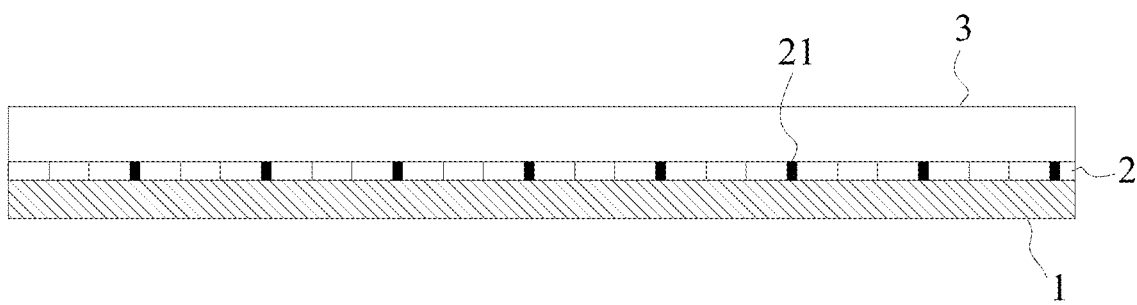
FIG. 6 is a schematic diagram of a color filter substrate according to an arrangement of the present disclosure.

An arrangement of the present disclosure provides a color filter substrate. As shown in FIG. 6, the color filter substrate may include a base substrate 3 and the color filter of the above arrangement.

The base substrate 3 may be made of glass, and of course, other transparent materials may be used.

The color filter may be disposed on a surface of the base substrate 3, and the photo-luminescent layer 2 is located between the base substrate 3 and the grating layer 1. Of course, the photo-luminescent layer 2 may also be located on the side of the grating layer 1 away from the base substrate 3. The arrangement of the present disclosure is described by taking the photo-luminescent layer 2 between the base substrate 3 and the grating layer 1 as an example.

The specific structure and beneficial effects of the color filter may be referred to the arrangement of the color filter described above, and will not be described in detail herein.

Figure 7:
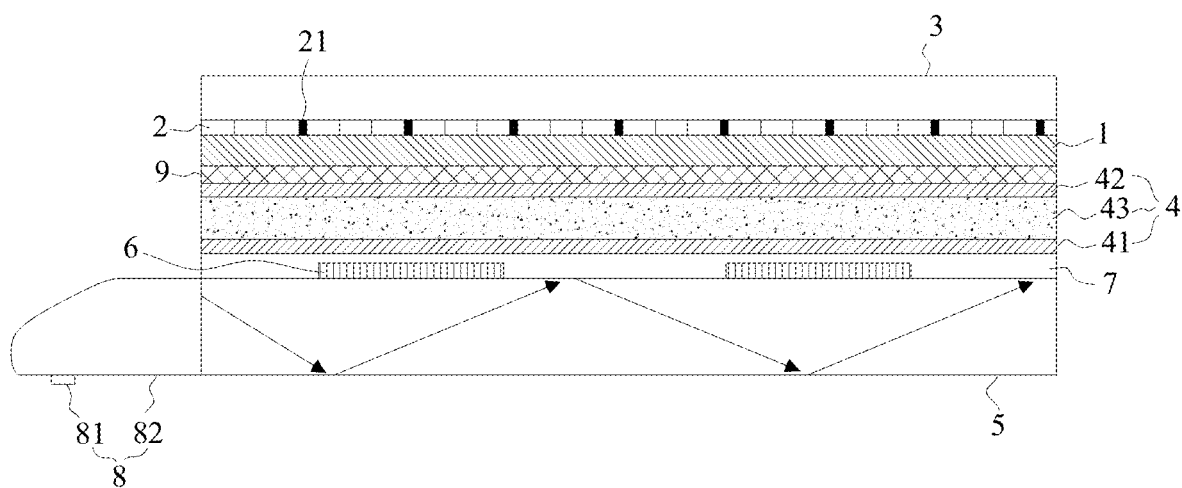
FIG. 7 is a schematic diagram of a display panel according to an arrangement of the present disclosure.

An arrangement of the present disclosure provides a display panel. As shown in FIG. 7, the display panel may be a liquid crystal display panel. Of course, other display panel capable of applying a color filter substrate may also be used.

The display panel of the arrangement of the present disclosure may include the color filter substrate of the above arrangement, and the specific structure of the color filter substrate will not be described in detail herein.

As shown in FIG. 7, the display panel of the arrangement of the present disclosure may further include a liquid crystal module 4 and a light guide plate 5.

The liquid crystal module 4 may be disposed on one side of the color filter substrate and on the side of the grating layer 1 away from the photo-luminescent layer 2 to change the transmittance.

For example, the liquid crystal module 4 may include a first electrode 41, a second electrode 42, and a liquid crystal layer 43.

Both of the first electrode 41 and the second electrode 42 may be made of a transparent conductive material such as indium tin oxide or the like. The liquid crystal layer 43 may be disposed between the first electrode 41 and the second electrode 42. An electric field may be applied to the liquid crystal layer 43 through the first electrode 41 and the second electrode 42 to control the deflection states of the liquid crystal molecules, thus realizing the adjustment of the light. The first electrode 41 may be located on a side of the liquid crystal layer 43 away from the color filter substrate, and the second electrode 42 may be located between the liquid crystal layer 43 and the color filter substrate. Of course, the positions of the first electrode 41 and the second electrode 42 may be interchanged.

The light guide plate 5 may be disposed on a side of the liquid crystal module 4 away from the color filter substrate, and the light may be irradiated to the liquid crystal module 4 through the light guide plate 5. In this process, the light may be totally reflected in the light guide plate 5 and uniformly emitted. The material of the light plate 5 may be acrylic or other transparent material.

The light guide plate 5 may include a light exiting surface and a light incident surface. The light exiting surface is a surface of the light guide plate 5 adjacent to the liquid crystal module 4, and the light exiting surface and the light incident surface may be two adjacent surfaces, or may be opposite surfaces.

As shown in FIG. 7, the display panel of the arrangement of the present disclosure may further include a light extraction layer 6, which may be disposed on a light exiting surface of the light guide plate 5. The liquid crystal module 4 may be disposed on a side of the light extraction layer 6 away from the light guide plate 5. The light emitted from the light guide plate 5 may be converted into polarized light of a collimated angle after passing through the light extraction layer 6. Since the light extraction layer 6 may extract the polarized light at a collimating angle which is an angle perpendicular to the light exiting surface, it may eliminate the provision of a polarizer between the liquid crystal module 4 and the light guide plate 5, which can reduce the thickness of the display panel.

In one arrangement, the light extraction layer 6 includes a plurality of light extraction gratings disposed on the light exiting surface of the light guide plate 5, and each of the light extraction gratings may be spaced apart. Each of the light extraction gratings may be a two-dimensional grating or a three-dimensional grating. As long as it may be used to extract the light from the light guide plate 5 at a collimating angle, the structure thereof is not particularly limited. Moreover, in the present arrangement, the display panel of the arrangement of the present disclosure may further include a planarization layer 7 which may be a transparent insulating material covering the surface of the light guide plate 5 adjacent to the liquid crystal module 4 and covering the light extraction gratings. Thus, it may realize flatness and may protect the light extraction gratings.

In other arrangements of the present disclosure, the light extraction layer 6 may include a light extraction grating that completely covers the light exiting surface of the light guide plate 5.

As shown in FIG. 7, the display panel of the arrangement of the present disclosure may further include a light source 8. The light source 8 may be disposed opposite to the light incident surface of the light guide plate 5, and may emit light to the light guide plate 5. The light emitted by the light source 8 may enter the light guide plate 5 through the light incident surface and be emitted from the light existing surface.

In an arrangement, the light exiting surface and the light incident surface are disposed adjacent to each other, and the light source 8 may include a light emitting member 81 and a reflector 82.

The light emitting member 81 may be disposed opposite to the light incident surface of the light guide plate 5, and the light emitting member 81 may be an LED chip. Of course, other light emitting devices may also be used. The number of the light-emitting members 81 may be plural, and arranged in a line, and may emit lights at the same time. The colors of the respective light emitting members 81 may be the same.

The reflector 82 may be disposed opposite to the light incident surface of the light guide plate 5. The reflector 82 is provided with a light entrance port. The light emitting member 81 is located outside the reflector 82 and may emit light toward the light entrance port. The inner wall of the reflector 82 reflects the light emitted from the light emitting member 81 toward the light incident surface, thus improving the utilization of light. Of course, the light emitting member 81 may also be directly disposed in the reflector 82.

Of course, in other arrangements of the present disclosure, the light exiting surface and the light incident surface of the light guide plate 5 may be oppositely disposed and parallel to each other, and the light source 8 may be disposed on a side of the light incident surface away from the light exiting surface.

As shown in FIG. 7, the display panel of the arrangement of the present disclosure may further include a polarizing layer 9, which may be a polarizing plate, and may be disposed between the grating layer 1 of the color filter substrate and the liquid crystal module 4. The polarization direction of the polarizing layer 9 may be the same as that of the light extraction layer 6. When the liquid crystal module 4 is not adjusted in the direction of the light, the light passing through the liquid crystal module 4 may pass through the polarizing layer 9.

In addition, the display panel of the arrangement of the present disclosure may further include other components such as a driving circuit, which are not enumerated here.

An arrangement of the present disclosure further provides a display device. The display device may include the display panel of the above arrangement. The specific structure of the display panel may refer to the implementation of the display panel, and details are not described herein.

Other arrangements of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

What is claimed is:

1. A color filter, comprising:
   a grating layer configured to generate a surface plasmon effect under an action of incident light; and a photo-luminescent layer disposed on a light exiting surface of the grating layer, wherein a grating period of the grating layer satisfies a formula:

$$P = n\lambda_0 \sqrt{\frac{\varepsilon_1 + \varepsilon_2}{\varepsilon_1 \cdot \varepsilon_2}}$$

wherein P denotes the grating period, n denotes a positive integer, $\lambda_0$ denotes a wavelength of the incident light, $\varepsilon_1$ denotes a dielectric constant of the grating layer, and $\varepsilon_2$ denotes a dielectric constant of the photo-luminescent layer.

2. The color filter according to claim 1, wherein the grating layer is in direct contact with the photo-luminescent layer.

3. The color filter according to claim 1, wherein the photo-luminescent layer comprises a quantum dot material.

4. The color filter according to claim 1, wherein a surface of the grating layer adjacent to the photo-luminescent layer has a plurality of slits that are spaced apart.

5. The color filter according to claim 1, wherein the grating layer comprises at least one of $SiO_2$, $TiO_2$, Au, Ag and Al.

6. A color filter substrate, comprising:
a base substrate; and
the color filter according to claim 1, wherein the color filter is provided on the base substrate.

7. The color filter substrate according to claim 6, wherein the photo-luminescent layer is located between the base substrate and the grating layer.

8. A display panel, comprising a color filter substrate according to claim 6.

9. The display panel according to claim 8, wherein the grating layer is in direct contact with the photo-luminescent layer.

10. The display panel according to claim 8, wherein the photo-luminescent layer comprises a quantum dot material.

11. The display panel according to claim 8, wherein a surface of the grating layer adjacent to the photo-luminescent layer has a plurality of slits that are spaced apart.

12. The display panel according to claim 8, further comprising:
a liquid crystal module disposed on a side of the grating layer away from the photo-luminescent layer; and
a light guide plate disposed on a side of the liquid crystal module away from the color filter substrate.

13. The display panel according to claim 12, wherein the light guide plate comprises a light exiting surface, the light exiting surface is a surface of the light guide plate adjacent to the liquid crystal module, and the display panel further comprises:
a light extraction layer disposed on the light exiting surface and configured to extract polarized light from the light guide plate at a collimation angle.

14. The display panel of claim 13, wherein the light extraction layer comprises a plurality of light extraction gratings spaced apart, and the display panel further comprises:
a planarization layer covering the surface of the light guide plate adjacent to the liquid crystal module and covering the light extraction gratings.

15. The display panel according to claim 13, wherein the light guide plate comprises a light incident surface adjacent to the light exiting surface; and the display panel further comprises:
a light source disposed opposite to the light incident surface and configured to emit light to the light guide plate.

16. The display panel according to claim 12, wherein the liquid crystal module comprises:
a first electrode;
a second electrode; and
a liquid crystal layer disposed between the first electrode and the second electrode.

17. The display panel according to claim 12, wherein the display panel further comprises:
a polarizing layer disposed between the color filter substrate and the liquid crystal module.

18. A display device comprising the display panel of claim 8.

* * * * *